United States Patent
Reddy et al.

(10) Patent No.: US 11,172,193 B1
(45) Date of Patent: Nov. 9, 2021

(54) METHOD AND SYSTEM TO CALIBRATE CAMERA DEVICES OF A VEHICLE VISION SYSTEM USING A PROGRAMMABLE CALIBRATION TARGET DEVICE

(71) Applicant: Argo AI, LLC, Pittsburgh, PA (US)

(72) Inventors: Dikpal Reddy, Palo Alto, CA (US);
Hsin Miao, Sunnyvale, CA (US);
Yu-Wei Chang, Cupertino, CA (US);
Erli Ding, Los Angeles, CA (US); Koji Gardiner, San Francisco, CA (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

(21) Appl. No.: 17/111,974

(22) Filed: Dec. 4, 2020

(51) Int. Cl.
*H04N 17/00* (2006.01)
*H04N 5/232* (2006.01)
*G06T 7/80* (2017.01)

(52) U.S. Cl.
CPC ............ *H04N 17/002* (2013.01); *G06T 7/80* (2017.01); *H04N 5/232939* (2018.08); *G06T 2207/30204* (2013.01)

(58) Field of Classification Search
CPC .. H04N 17/002; H04N 5/232939; G06T 7/80; G06T 2207/30204
See application file for complete search history.

(56) References Cited

U.S. PATENT DOCUMENTS

| | | | |
|---|---|---|---|
| 8,743,214 B2 | 6/2014 | Grossmann et al. | |
| 8,872,897 B2 * | 10/2014 | Grossmann | G06T 7/80 348/46 |
| 9,282,326 B2 * | 3/2016 | Olson | G06T 7/80 |
| 9,965,870 B2 * | 5/2018 | Claveau | G06T 7/80 |
| 9,996,931 B2 * | 6/2018 | Yamamoto | G06T 7/60 |
| 10,165,263 B2 * | 12/2018 | Tezaur | G06T 7/80 |
| 10,192,325 B2 * | 1/2019 | Shen | H04N 17/002 |
| 10,388,030 B2 * | 8/2019 | Wakai | H04N 5/23293 |
| 10,425,638 B2 * | 9/2019 | Yu | G06K 9/6211 |
| 10,445,898 B2 * | 10/2019 | Liu | G06T 7/80 |
| 10,460,473 B1 * | 10/2019 | McMichael | H04N 17/002 |
| 10,510,162 B2 * | 12/2019 | Doganis | H04N 5/44504 |

(Continued)

OTHER PUBLICATIONS

Ha, H., et al., "Accurate Camera Calibration Robust to Defocus Using a Smartphone," Computer Vision Foundation. pp. 828-836.

(Continued)

*Primary Examiner* — Brian P Yenke
(74) *Attorney, Agent, or Firm* — Fox Rothschild LLP

(57) ABSTRACT

A method for calibration of vision sensors includes, by a processor: selecting a calibration sequence that has a base calibration pattern and calibration angles, generating a calibrating target that may include the calibration pattern at a selected calibration angle of the angles, and causing a display screen to display a digital image representative of the target at the selected angle relative to an originating border of the selected angle. Each of the calibration angles is associated with a different originating border of the screen. The method includes by a vision sensor capturing at least one image of the calibrating target displayed on the screen. The calibration is repeated for each calibration angle of the sequence. The method includes performing calibration of the vision sensor in response to image signal processing of extracted calibration features in the at least one image of the calibrating targets.

20 Claims, 10 Drawing Sheets

(56) References Cited

U.S. PATENT DOCUMENTS

| | | | |
|---|---|---|---|
| 10,552,983 B1* | 2/2020 | Slobodyanyuk | G06T 7/80 |
| 10,798,353 B2* | 10/2020 | Matsuzawa | H04N 17/002 |
| 10,841,570 B2* | 11/2020 | Kytsun | G01C 25/00 |
| 2004/0170315 A1* | 9/2004 | Kosaka | G06T 5/006 |
| | | | 382/154 |
| 2008/0002041 A1* | 1/2008 | Chuang | H04N 9/3185 |
| | | | 348/241 |
| 2010/0134634 A1* | 6/2010 | Witt | G06T 7/74 |
| | | | 348/181 |
| 2015/0237344 A1* | 8/2015 | Lee | H04N 17/002 |
| | | | 348/187 |
| 2017/0111582 A1* | 4/2017 | Hu | G06T 3/4038 |
| 2017/0287166 A1* | 10/2017 | Claveau | H04N 17/002 |
| 2017/0287167 A1* | 10/2017 | Kweon | H04N 17/002 |
| 2018/0213218 A1* | 7/2018 | Yu | H04N 17/002 |
| 2018/0322657 A1* | 11/2018 | Dubout | G06T 7/74 |
| 2019/0005680 A1* | 1/2019 | Wang | H04N 5/3572 |
| 2020/0065994 A1* | 2/2020 | Slobodyanyuk | H04N 17/002 |
| 2020/0273205 A1* | 8/2020 | Yamashita | G06T 15/20 |
| 2020/0406904 A1* | 12/2020 | Yan | G01S 7/40 |
| 2021/0110575 A1* | 4/2021 | Hu | H04N 17/002 |
| 2021/0176394 A1* | 6/2021 | Okuhara | H04N 5/23222 |
| 2021/0241492 A1* | 8/2021 | Hsu | G06T 7/80 |

OTHER PUBLICATIONS

Tan, L. et al., "Automatic Camera Calibration Using Active Displays of a Virtual Pattern," www.mdou/journal.sensors, Sensors 2017, 17, 685; doi:10.3390/s17040685.

Zongqian, Z., "Camera Calibration Based on Liquid Crystal Display (LCD)," School of Geodesy and Geomatics, Wuhan University, pp. 15-20.

\* cited by examiner

METHOD AND SYSTEM TO CALIBRATE CAMERA DEVICES OF A VEHICLE VISION SYSTEM USING A PROGRAMMABLE CALIBRATION TARGET DEVICE

BACKGROUND

The document describes methods and systems that are directed to calibrating camera devices of a vehicle vision system using a single programmable calibration target device.

Most camera calibration methods rely on imaging known flat checkerboard panels at different orientations and distances to the camera device such that they are in the camera's depth-of-field. For automotive camera devices which are far-field cameras, the targets either end up being large (so as to cover the field-of-view of the camera) or require a large number of smaller targets which span the camera's field-of-view. This is true for any camera device that has a long hyperfocal distance (as a function of focal length/pixel size/aperture), such as cameras that may be used in automotive, machine vision and virtual reality applications. Using checkerboard panels has huge space requirements used for determining camera intrinsic parameters.

Increased space for the far-field camera targets implies a reduced space for other sensor modalities such as radar. Further, increased space requirements require large calibration terminals, which can be expensive in geographic locations where available real estate is limited.

This patent document describes improved camera calibration methods and systems that are directed to addressing at least some of the issues discussed above.

SUMMARY

In some embodiments, a method for calibration of vision sensors may include (i) by a processor, selecting a calibration sequence that has a base calibration pattern and calibration angles. Each of the calibration angles is associated with a different originating perimeter border of originating perimeter borders of a display screen. The method may include (ii) by the processor, generating a calibrating target that may include the calibration pattern at a selected calibration angle of calibration angles; and (iii) by the processor, causing the display screen to display a digital image representative of the calibrating target at the selected calibration angle relative to the originating perimeter border of the selected calibration angle. The method may include (iv) by a vision sensor, at a fixed location, capturing at least one image of the calibrating target displayed on the display screen; and (v) repeating (ii)-(iv) for each calibration angle of the calibration angles in the calibration sequence. The method may include (vi) performing calibration of the vision sensor in response to image signal processing of extracted calibration features in the at least one image of the calibrating targets of the calibration sequence.

In various embodiments, the method may further include: (vii) prior to (iii), generating an index marker in a first one of the displayed digital images of the calibration sequence; (viii) selecting an additional calibration pattern of the calibration sequence; and (ix) repeating (ii)-(vii) for the additional calibration pattern.

In various embodiments, the base calibration pattern may include vertical or horizontal alternating black and white stripes. The extracted calibration features may include markers. Each marker may be associated with a different corner of two adjacent stripes of the alternating black and white stripes. The index marker may include a barcode or matrix code in the first displayed image of the target.

In various embodiments, the (vi) step (performing the calibration) may include (a) performing image signal processing to extract the calibration features in the at least one image of the calibrating target captured by the vision sensor and (b) determining an image quality metric for at least one extracted calibration feature.

In various embodiments, the calibration angles may include $+Z°$ pitch angle, $-Z°$ pitch angle, $+Z°$ yaw angle and $-Z°$ yaw angle, where $|Z°|$ is a non-zero value.

In various embodiments, the calibration pattern at the selected calibration angle relative to the originating perimeter border may include a linear perspective originating at the originating perimeter border extended in a direction to a vanishing point in a horizon.

In various embodiments, the right and left display screen borders are perpendicular to the top and bottom display screen perimeter borders. Additionally, the (ii) step (generating of the calibrating target) may include: (a) editing the calibration pattern; (b) removing a portion of the calibration pattern that is adjacent to an opposite parallel perimeter border relative to the originating perimeter border and tapered portions along those display screen borders perpendicular to the originating perimeter border; (c) selecting a background color for the removed portions; and (d) rendering the edited calibration pattern on the display screen with pixels of the removed portion that has the background color.

In various embodiments, the fixed location is less than one meter from the display screen.

In various embodiments, a system for calibration of vision sensors includes a calibration target device that may include a display screen and a processor. The system also includes a computer-readable storage medium including programming instructions that are configured to, when executed, cause the processor to: (i) select a calibration sequence that has a base calibration pattern and calibration angles, wherein each of the calibration angles is associated with a different relative originating perimeter border of originating perimeter borders of the display screen; (ii) generate a calibrating target that may include a calibration pattern at a selected calibration angle of calibration angles; (iii) cause the display screen to display a digital image representative of the calibrating target at the selected calibration angle relative to the originating perimeter border of the selected calibration angle; (iv) cause a vision sensor, at a fixed location, to capture at least one image of the calibrating target displayed on the display screen; (v) repeat (ii)-(iv) for each calibration angle of the calibration angles in the calibration sequence; and (vi) perform calibration of the vision sensor in response to image signal processing of extracted calibration features in the at least one image of the calibrating targets of the calibration sequence.

In various embodiments, the programming instructions of the system may be further configured to, when executed, cause the processor to: (vii) prior to (iii) generate an index marker in a first one of the displayed digital images of the calibration sequence; viii) select an additional calibration pattern of the calibration sequence; and (ix) repeat (ii)-(vii) for the additional calibration pattern.

In various embodiments, the programming instructions of the system to perform the calibration may further include instructions which are configured to, when executed, cause the processor to perform image processing to extract the calibration features in the at least one image of the target captured by the vision sensor and determine an image quality metric for at least one extracted calibration feature.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
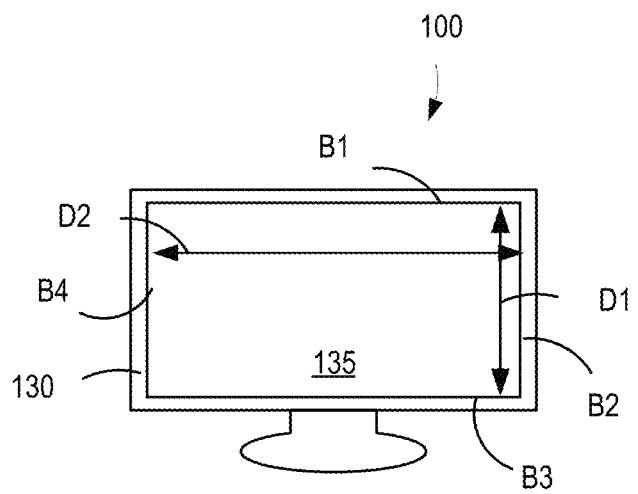
FIG. 1 illustrates an example system for calibrating camera devices, in accordance with various embodiments of the present disclosure.
Figure 1:
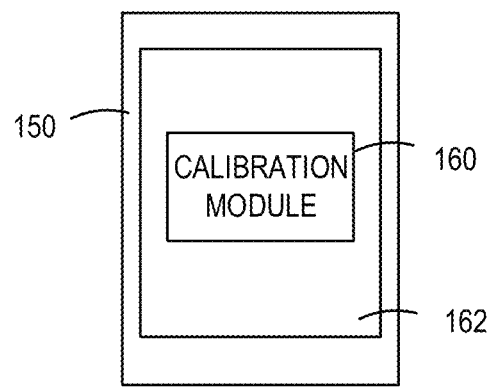

Referring now to FIG. 1, a calibration system 100 for calibrating camera devices 23 (FIG. 2) is shown. FIG. 1 will also be described in relation to FIG. 2 which illustrates a setup for calibrating a camera device 23. In various embodiments, camera device 23 includes a vision sensor for a computer vision system. The vision sensor may be configured to be installed in an autonomous vehicle. The terms "camera device" and "vision sensor" may be used interchangeably. Camera device 23 may be a red, green, blue (RGB) camera device that is configured to capture light of frequencies in the RGB color space using a sensor such as a charge-coupled device (CCD) sensor or a complementary metal-oxide semiconductor (CMOS) sensor, an RGB color model. However, it should be understood that camera device 23 is not limited to a RGB camera device, and other types of cameras may benefit from the calibration methods and devices described in this document.

Calibration system 100 includes a programmable calibration target device 130. As will be described in further detail below, calibration target device 130 is a single device with a programmable target capable of displaying a controlled sequence of virtual digital images to calibrate camera device(s) 23. Example calibration target devices include liquid crystal display (LCD) monitors, plasma-screen display devices, and light-emitting diode (LED) monitors. Calibration target device 130 may be mounted or placed upon a desktop or workbench 31 or other structure capable of elevating calibration target device 130 above the ground surface 21 and in the field-of-view of camera device(s) 23. However, it is to be understood that calibration target device 130 may be elevated above the ground surface 21 using any appropriate means and/or at any appropriate height. Furthermore, in some embodiments, during a calibration process, a camera device 23 may be positioned at a distance of less than one (1) meter away from calibration target device 130 with a fixed focus. Calibration target device 130 may include a display screen 135. For the purposes of calibration, the focus is fixed. It should be understood, however, that the camera device may have an adjustable focus which can be subsequently fixed to perform a calibration process. The disclosure herein may be used with camera devices with an autofocus feature.

During calibration, display screen 135 is captured in the field-of-view of a lens 25 of camera device 23. However, it is to be understood that the distance between camera device 23 and calibration target device 130 is not limited to less than 1 meter, and may vary based on, e.g., the size of display screen 135 of calibration target device 130.

Display screen 135 is configured to display a programmable sequence of virtual digital images of at least one calibration pattern to camera device 23. Display screen 135 of calibration target device 130 may include a flat LCD panel, for example. Display screen 135 may include an LED display panel. However, it should be understood that display screen 135 is not limited to LCD or LED panels.

Display screen 135 may include perimeter borders denoted as B1, B2, B3 and B4. A top display screen border is denoted as B1. A bottom display screen border is denoted as B3 and is opposite and parallel to top display screen border B1. A right display screen border is denoted as B2 and a left display screen border is denoted as B4. Left display screen B4 is opposite and parallel to right display screen border B2. Right and left display screen borders B2 and B4 are perpendicular to top and bottom display screen borders B1 and B3.

Display screen 135 may have a refresh rate of 50 Hertz (Hz), 60 Hz, 120 Hz, 240 Hz, or any suitable frequency For example, display screen 135 may be a 43 inch display a resolution of dimension D2×dimension D1. The dimensions D1 and D2 are relative and related to the Y-axis and X-axis of the display screen. For a 4K resolution of approximately 3800×2160, the value D2 may be 3800 which represents the number of pixels along top and bottom borders B1 and B3; and the value D1 may be 2160 which represents the number of pixels along right and left borders B2 and B4. In another embodiment, display screen 135 may be a 43 inch display with a resolution of 1920×1080 or other resolutions. However, it should be understood that other display screen sizes and resolutions may be used. However, the distance of the vision sensor relative to display screen 135 may be increase or decrease.

Calibration target device 130 is coupled to a calibration controller 150. Calibration target device 130 may be communicative coupled via wireless or wired communication mediums with calibration controller 150. Calibration controller 150 may be implemented as a software, firmware and/or hardware module that includes programming instructions for performing the functions of a calibration module 160. Calibration controller 150 may include one or more processors, such as one or more digital signal processors (DSPs), graphics processing unit, general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements. Programming instructions of calibration module 160 may be executed by the one or more processors.

Calibration controller 150 may include its own display screen 162 or may use display screen 135. In various embodiments, display screen 162 is optional. Calibration controller 150 will be described in more detail in relation to FIG. 9. Calibration module 160 may include sub-modules of software, firmware and/or hardware that includes programming instructions for performing functions described herein. Calibration target device 130 may be configured to overcome blur, reduce the size of the targets but also reducing the number of targets. In some embodiments, calibration target device 130 and calibration controller 150 may be integrated into a single housing.

The methods described herein may be performed in the order shown or a different order. One or more blocks of the methods may be omitted and other blocks added. One or more blocks may be performed contemporaneously.

Figure 3:
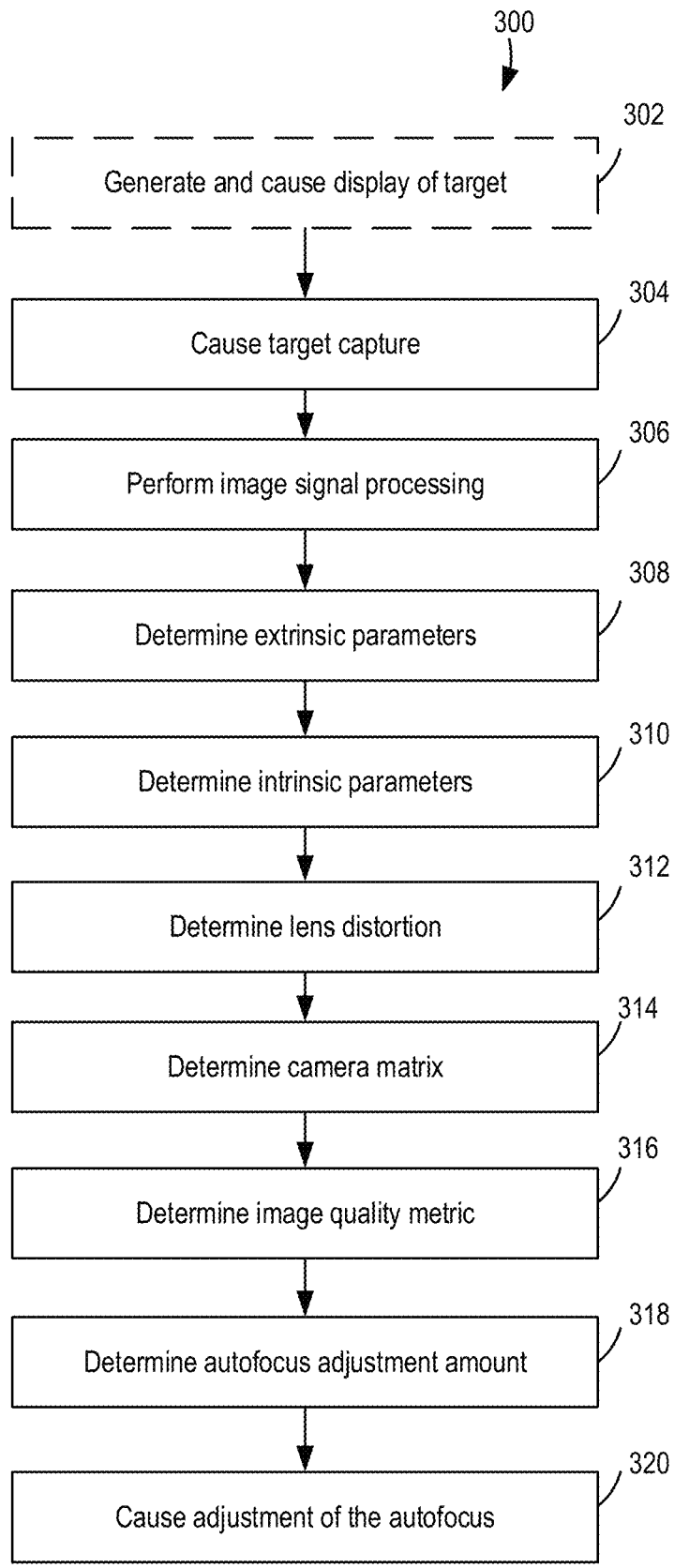
FIG. 3 illustrates a flowchart of a method for calibrating a vision sensor.

FIG. 3 illustrates a flowchart of a method 300 for calibrating a vision sensor. FIG. 3 will be described with reference to FIG. 4 which illustrates a flowchart of a method 400 for capturing image data of at least one calibrating target for the calibration method of FIG. 3. For the sake of illustration, method 300 requires image data representative of at least one captured image of at least one target through lens 25 of camera device 23 that is being calibrated. The target generation and image capture phase of the calibration process will be described in more detail in relation to FIG. 4. Method 300 may include, at block 302, generating a calibrating target. Block 302 may include causing the display of the target on display screen 135 of calibration target device 130. Method 300 may include, at block 304, causing the capture of at least one image such as of the at least one target. Block 302 is denoted in a dashed block and will be described in relation to block 302A, 302B and 302C of FIG. 4.

Method 300 may include, at block 306, performing image signal processing, e.g., feature extraction, to extract the calibration features in the at least one image of the at least one target captured by the vision sensor. Image signal processing may employ machine learning algorithms such as without limitations feature extraction algorithms. Feature extraction algorithms may include, without limitation, edge detection, corner detection, template matching, texture processing, segmentation image processing, background subtraction, fiducial marker recognition and classification, etc. The extracted features are used to determine at least one of an extrinsic parameter, an intrinsic parameter, or lens distortion parameter. Extracted features may include edges between alternating stripes, corners of stripes, texture of at least one stripe, and fiducial markers. These extracted features are analyzed to determine one or more of extrinsic parameters, intrinsic parameters and lens distortion.

Method 300 may include, at block 308, determining extrinsic parameters and at block 310, determining intrinsic parameters based on the image processing. Method 300 may include, at block 312, determining lens distortion and at block 314, determining a camera calibration matrix based on an intrinsic matrix of the intrinsic parameters, the extrinsic parameter and lens distortion.

For determining camera intrinsic parameters, checkerboards at different orientations have been used for an accurate and stable calibration solution. The inventors have determined that using printed targets, either the target orientation needs to be physically changed through actuation or multiple targets used at different orientations which is laborious and increases the time to complete calibration of each vision sensor.

Figure 2:
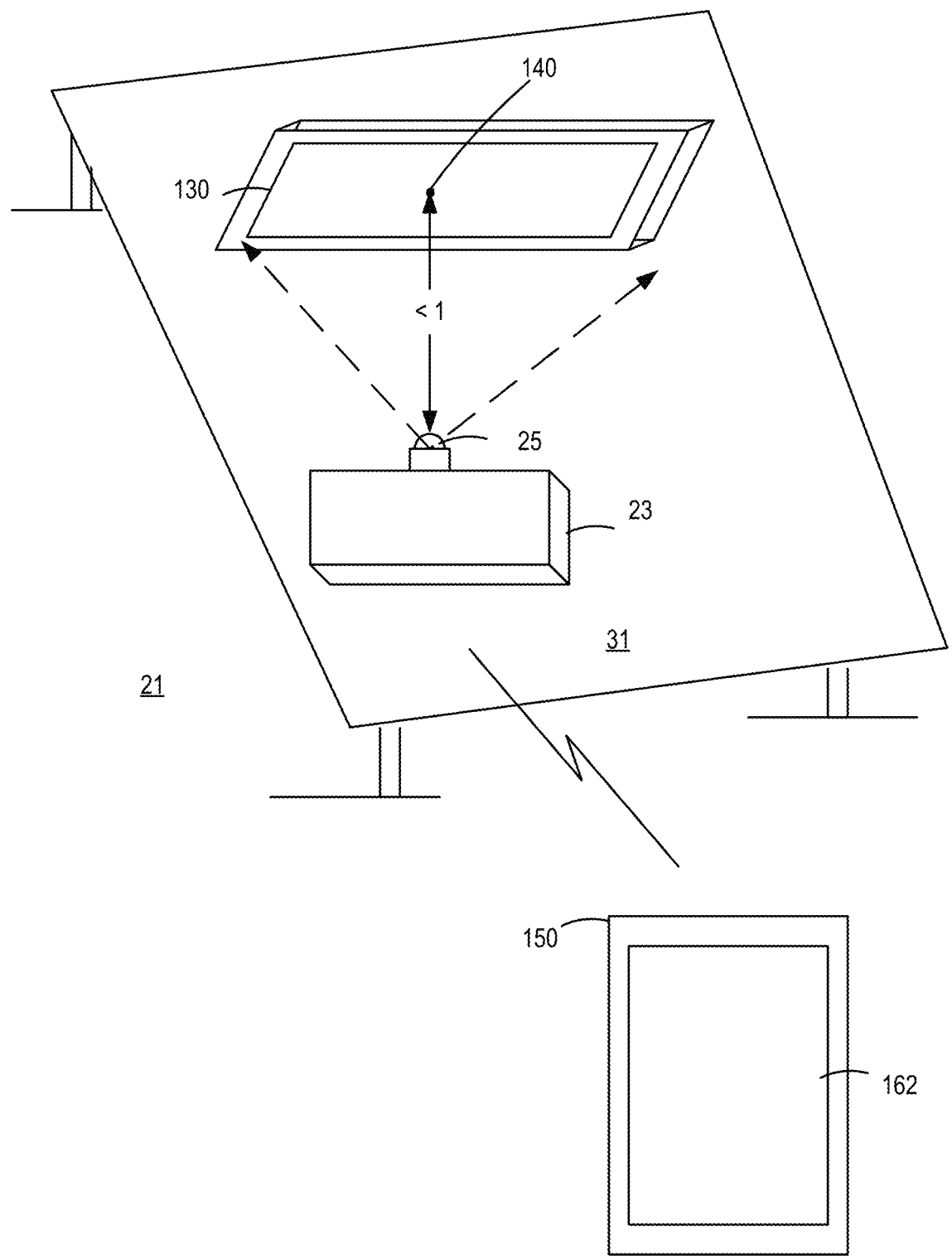
FIG. 2 illustrates a setup for calibrating a camera device using the system of FIG. 1.

Camera intrinsic parameters may include a focal length and optical center 140 (FIG. 2), for example. The camera intrinsic parameters may include a pixel skew coefficient. The camera intrinsic parameters are used to create a camera intrinsic matrix. The camera extrinsic parameters may include rotation and translation, for example. The extrinsic parameters are useful in a computer vision system to transform a three-dimensional (3D) global coordinate system of the real world to those coordinates associated with a coordinate system of a camera. The camera calibration process may employ a camera calibration process which determines a camera intrinsic matrix and a camera extrinsic parameters. The camera calibration process may also employ algorithms to compensate for the lens distortion which is a function of the lens. In various embodiments, the vision sensor is positioned during setup to place the sensor's focal length through optical center 140 (FIG. 2).

Method 300 may include, at block 316, determining an image quality metric for at least one extracted calibration feature. For example, the image quality metric may determine an amount of blur or defocus blur. The image quality metric may determine an amount of lens distortion.

Method 300 may include, at block 318, in response to the image processing, determining an adjustment amount to an autofocus setting of the vision sensor to compensate for the determined image quality metric. Method 300 may include, at block 320, causing adjustment of the autofocus setting of the vision sensor by the adjustment amount. In various embodiments, the autofocus adjustments and autofocus settings can be omitted or used to focus the camera before starting the calibration process.

When calibrating a vision sensor, blur may be overcome by placing a camera device up close to display screen 135 of calibration target device 130 with different orientations virtually (i.e. the flat LCD panel acts as a virtual window to the world with targets at different orientations) of a target while display screen 135 remains stationary. Thus, new virtual calibration patterns can be added or removed with programming instructions and no change in the hardware. The calibration patterns used to create targets may be configured to overcome defocus blur. The calibration patterns also allows target orientations to be change according to an automatic calibration sequence.

The virtual calibration patterns are configured to reduce space required for calibrating far-field and long hyperfocal distance cameras to enable their deployment on a camera production line, for example. The calibration patterns are configured to remove the need for multiple targets or any actuating robot arms for changing the target's orientations making it simpler for operators to calibrate a vision sensor. The calibration method may include hyperfocal distance calibration. The calibration method may include far-field calibration.

Figure 4:
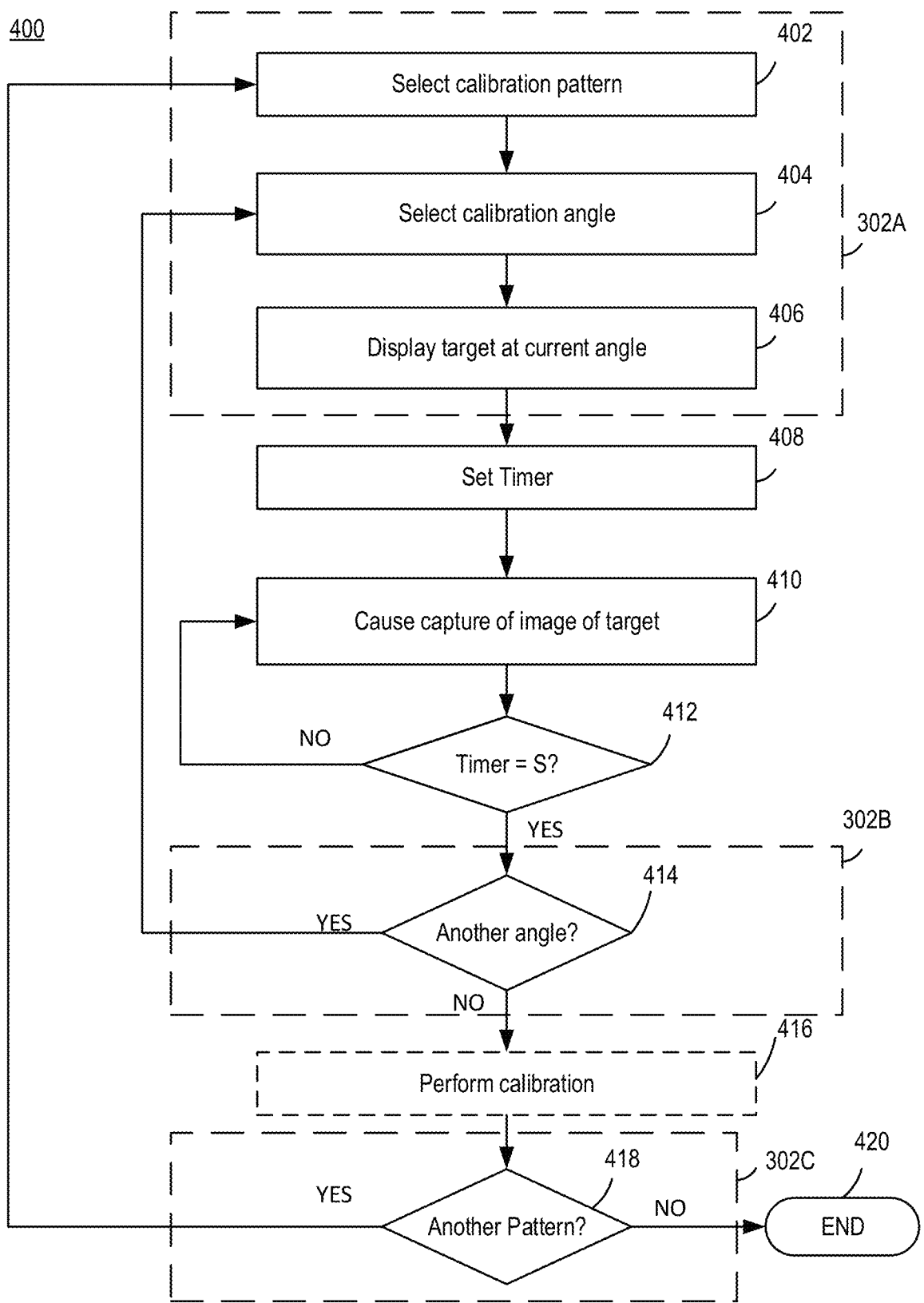
FIG. 4 illustrates a flowchart of the method for capturing image data for the calibration method of FIG. 3.
Figure 5A:
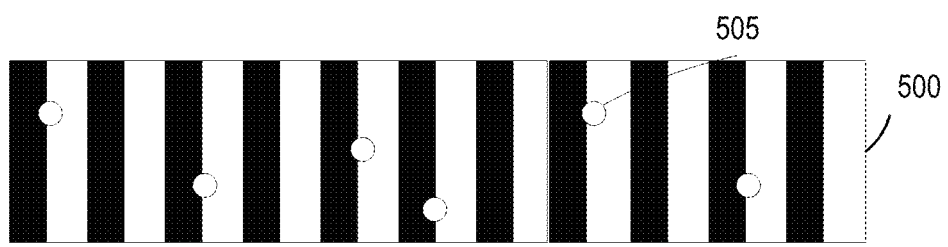
FIG. 5A illustrates a base calibration pattern with fiducial markers.
Figure 5B:
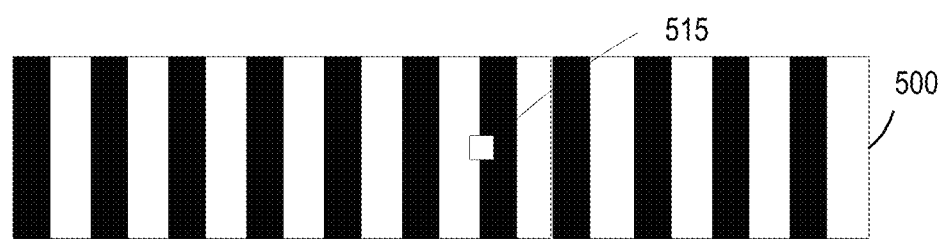
FIG. 5B illustrates a base calibration pattern with a QR code.

FIG. 4 illustrates a flowchart of a method 400 for capturing image data of at least one calibrating target for calibration method 300 of FIG. 3. Method 400 may include, at block 402, selecting a calibration sequence having a base calibration pattern and one or more calibration angles. The base calibration pattern may include vertical or horizontal stripes of alternating colors. For example, in FIGS. 5A-5B shown below, a base calibration 500 pattern includes vertical stripes alternating in black and white colors. However, it should be understood other patterns may be used. Method 400 may include, at block 404, selecting a first calibration angle of the calibration angles in the sequence. This selection may be a sequential selection, using a first (or a next) angle in the sequence, or it may be a random selection of one of the available angles in the sequence. Each calibration angle is associated with a relative different originating perimeter border of the originating perimeter borders of display screen 135. The calibration angles may include +Z° pitch angle, −Z° pitch angle, +Z° yaw angle and −Z° yaw angle where the |Z°| is a non-zero value. For example, in some embodiments the |Z°| value is 20. The calibration angle may include a first image angle of 0°, in some variations such as to index the calibration angles in the calibration sequence. In some variations, blocks 402 and 404, may include retrieving a first image representative of the target of a pre-stored sequence for a respective one pattern.

Method 400 may include, at block 406, displaying on display screen 135 a virtual digital image (i.e., target) representative of the (base or selected) calibration pattern at the selected calibration angle relative to the originating perimeter border. Blocks 402, 404 and 406 are part of block 302A. The selected calibration pattern at the selected calibration angle relative to the originating perimeter border includes a linear perspective originating at the originating perimeter border. FIGS. 6A-6D illustrate display of a base calibration pattern and multiple calibration angles, each of which is associated with a calibration angle that is relative to a different originating perimeter border of the display screen 135.

FIG. 5A illustrates a base calibration pattern 500 with added fiducial markers 505. Calibration pattern 500 is represented with an orientation of Z=0°. FIG. 5B illustrates a base calibration pattern 500 with an added index marker 515 such as a QR code, other barcode or matrix code, or other index fiducial marker. As will be described below, multiple calibration patterns may be used in some embodiments. Base calibration pattern 500 may or may not include the markers.

Figure 6A:
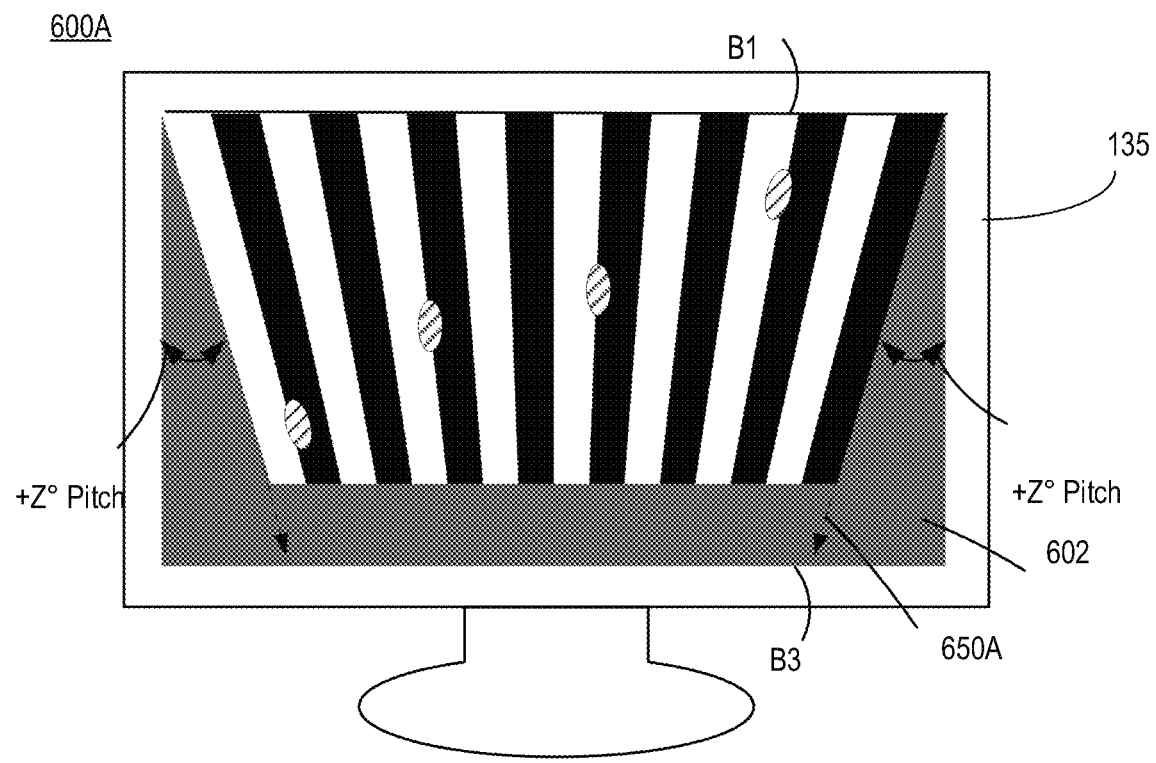
FIGS. 6A and 6B illustrate example calibrating targets with a calibrating pattern oriented at pitch angles +Z and −Z, respectively.
Figure 6B:
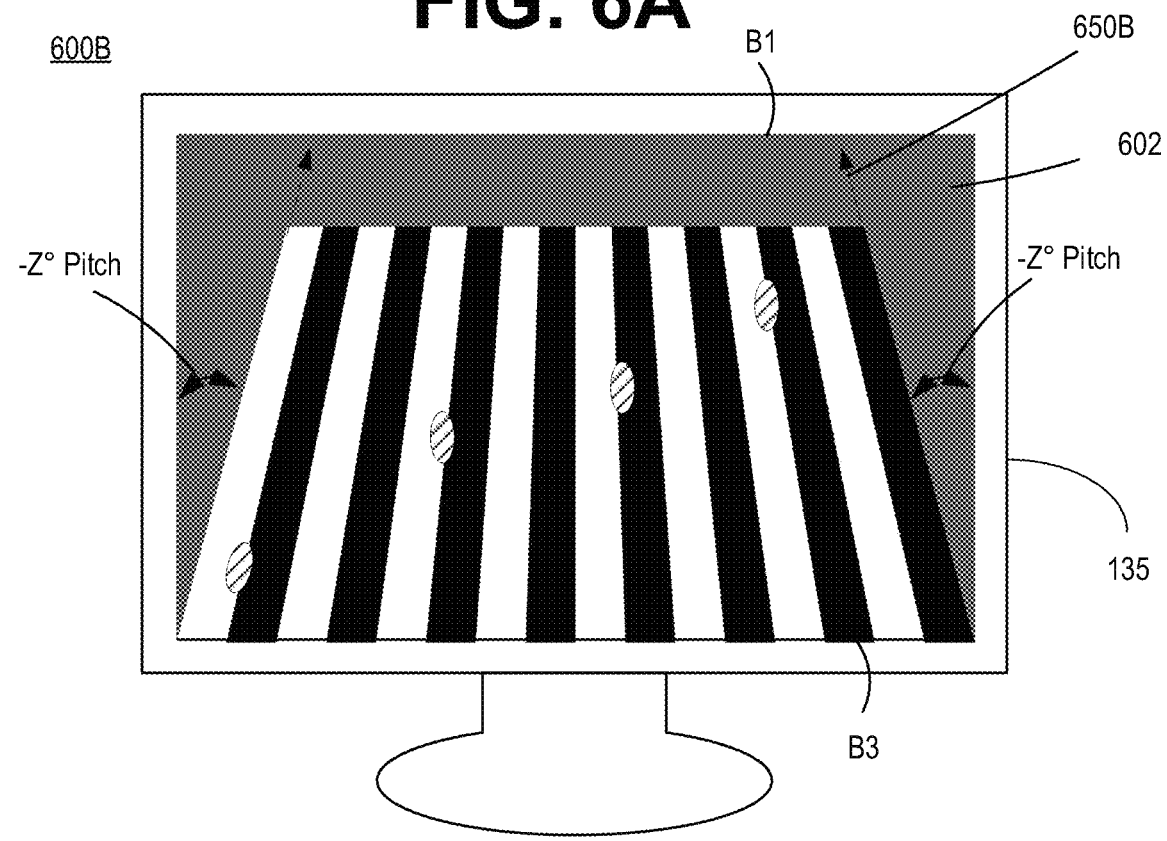

The linear perspective of the pattern may be truncated to the vanishing point between the originating perimeter border and the opposite, parallel perimeter border to the horizon in either one of a horizontal plane or vertical plane. The linear perspective of the targets illustrated in FIGS. 6A-6B is based on one vanishing point to the horizon in a horizontal plane but from different calibration angles +Z° pitch angle and −Z° pitch angle, respectively. As shown in FIGS. 6A and 6B, the pattern is shown at orientations with pitch angles of Z°=+20° and Z°=−20°, respectively. The pitch angle is an angle measured by a degree of rotation about an X-axis.

Figures 6C, 6D:
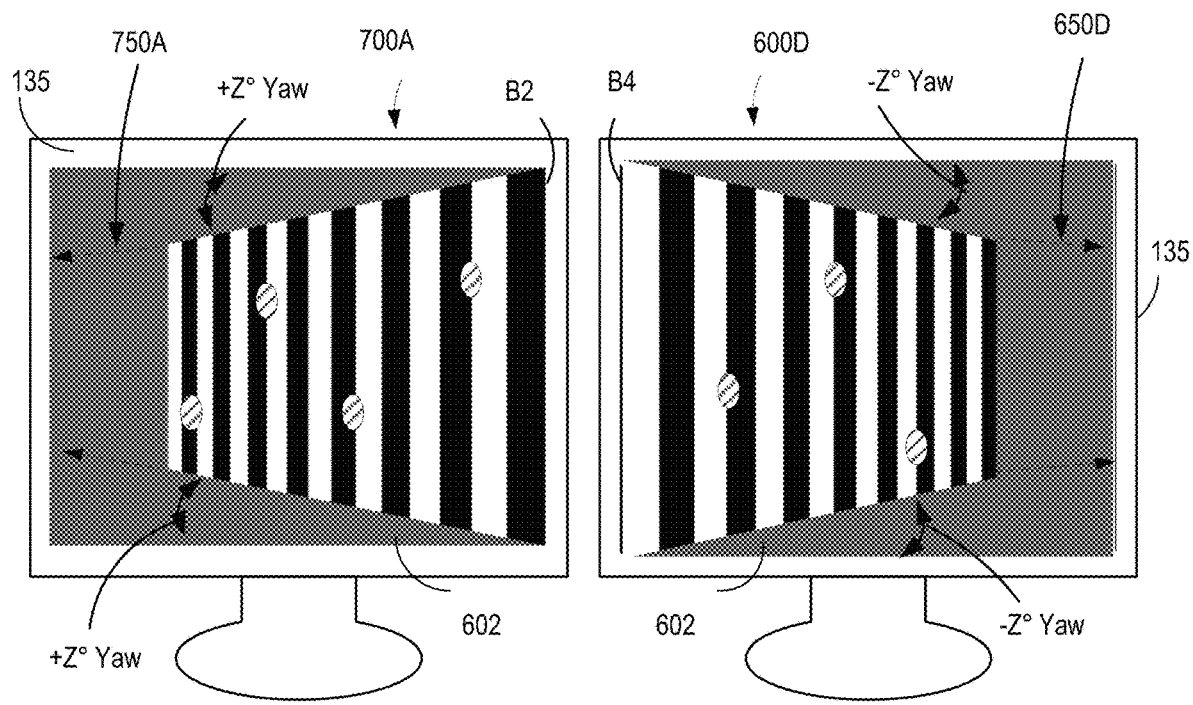
FIGS. 6C and 6D illustrate example calibrating targets with the calibrating pattern oriented at yaw angles +Z and −Z, respectively.

The linear perspective of the target illustrated in FIGS. 6C-6D is based on one vanishing point to the horizon in a vertical plane but from different calibration angles +Z° yaw angle and −Z° yaw angle, respectively. In some variations, the linear perspective of a base calibration pattern from any one calibration angle may include more than one vanishing point perspective to the horizon. As shown in FIGS. 6C and 6D, the pattern is shown at orientations with yaw angles of Z°=+20° and Z°=−20°, respectively. The yaw angle is an angle measured by a degree of rotation about a Y-axis. Calibrating targets 600A, 600B, 600C and 600D are based on calibration pattern 500 as shown in FIGS. 5A and 5B. The calibration pattern 500 is represented within a parallelogram, for example, with four borders corresponding to an aspect ratio or resolution of a display screen.

Referring specifically to FIG. 6A, a calibrating target 600A with a selected base calibration pattern 500 (FIG. 5A or 5B) orientated at the +Z° pitch angle is illustrated. Calibrating target 600A has a first linear perspective of the pattern angled at the +Z° pitch angle which originates at the originating perimeter border (i.e., top display screen border B1). The dashed lines 650A depict the direction to the vanishing point between the originating perimeter border (i.e., top display screen border B1) and the opposite, parallel perimeter border (i.e., bottom display screen border B3) to the horizon in a horizontal plane. Base calibration pattern 500 is dimensioned according to an aspect ratio or resolution of display screen 135. Pixels of the target are populated with calibration pattern colors modified to represent a truncated linear perspective of the pattern and forms, for example, a trapezoid with the pattern angled at the +Z° pitch angle from display screen 135 borders. The remaining pixels of the background of target 600A are populated with a background color.

Target 600A represents an image according to an aspect ratio of display screen 135. By way of non-limiting example, the linear perspective of base calibration pattern 500 to form target 600A may be generated based on a vanishing point on the horizon in a direction of and aligned with a mid-point of an X-axis of an aspect ratio of a display screen. The mid-point of the aspect ratio corresponds to the border (i.e., bottom display screen border B3) opposite and parallel to the originating perimeter border (i.e., top display screen border B1).

Referring specifically to FIG. 6B, a calibrating target 600B with the selected calibration pattern oriented at the −Z° pitch angle is illustrated. Target 600B has a second linear perspective of the pattern angled at the −Z° pitch angle which originates at the originating perimeter border (i.e., bottom display screen border B3). The dashed lines 650B depict the direction to the vanishing point between the originating perimeter border (i.e., bottom display screen border B3) and the opposite, parallel perimeter border (i.e., top display screen border B1) to the horizon in a horizontal plane. Pixels of the target are populated with pattern colors modified to represent a truncated linear perspective of the pattern and forms, for example, a trapezoid with the pattern angled at the −Z° pitch angle from the display screen 135 borders. The remaining pixels of the background of the target 600B are populated with a background color.

Target 600B represents an image according to an aspect ratio of display screen 135. By way of non-limiting example, the linear perspective of base calibration pattern 500 to form target 600B may be generated based on a vanishing point on the horizon in a direction of and aligned with a mid-point of an X-axis of an aspect ratio of a display screen. The mid-point of the aspect ratio corresponds to the perimeter border (i.e., top display screen border B1) opposite and parallel to the originating perimeter border (i.e., bottom display screen border B3).

Referring specifically to FIG. 6C, a calibrating target 600C with the selected calibration pattern oriented at the +Z° yaw angle is illustrated. The target has a third linear perspective of the pattern angled at the +Z° yaw which originates at the originating perimeter border (i.e., right display screen border B2). The dashed lines 650C depict the direction to the vanishing point between the originating perimeter border (i.e., right display screen border B2) and the opposite, parallel perimeter border (i.e., left display screen border B4) to the horizon in a vertical plane. Pixels of the target are populated with pattern colors modified to represent a truncated linear perspective of the pattern and forms, for example, a trapezoid with the pattern angled at the +Z° yaw angle from the display screen 135 borders. The remaining pixels of the background of the target 600C are populated with a background color.

Target 600C represents an image according to an aspect ratio of display screen 135. By way of non-limiting example, the linear perspective of base calibration pattern 500 to form target 600C may be generated based on a vanishing point on the horizon in a direction of and aligned with a mid-point of a Y-axis of an aspect ratio of a display screen. The mid-point of the aspect ratio corresponds to the perimeter border (i.e., left display screen border B4) opposite and parallel to the originating perimeter border (i.e., right display screen border B2).

Referring specifically to FIG. 6D, a calibrating target 600D with the selected calibration pattern at the −Z° yaw angle is illustrated. The target has a fourth linear perspective angled at the −Z° yaw angle which originates at the originating perimeter border (i.e., left display screen border B4). The dashed lines 650D depict the direction to the vanishing point between the originating perimeter border (i.e., left display screen border B4) and the opposite, parallel perimeter border (i.e., right display screen border B2) to the horizon in a vertical plane. Pixels of the target are populated with pattern colors modified to represent a truncated linear perspective of the pattern 500 and forms, for example, a trapezoid with the pattern angled at the +Z° yaw angle from the display screen 135 borders. The remaining pixels of the background of the target 600D are populated with a background color.

Target 600D represents an image according to an aspect ratio of display screen 135. By way of non-limiting example, the linear perspective of base calibration pattern 500 to form target 600D may generated based on a vanishing point on the horizon in a direction of and aligned with a mid-point of a Y-axis of an aspect ratio of a display screen. The mid-point of the aspect ratio corresponds to the perimeter border (i.e., right display screen border B2) opposite and parallel to the originating perimeter border (i.e., left display screen border B4).

Figure 9:
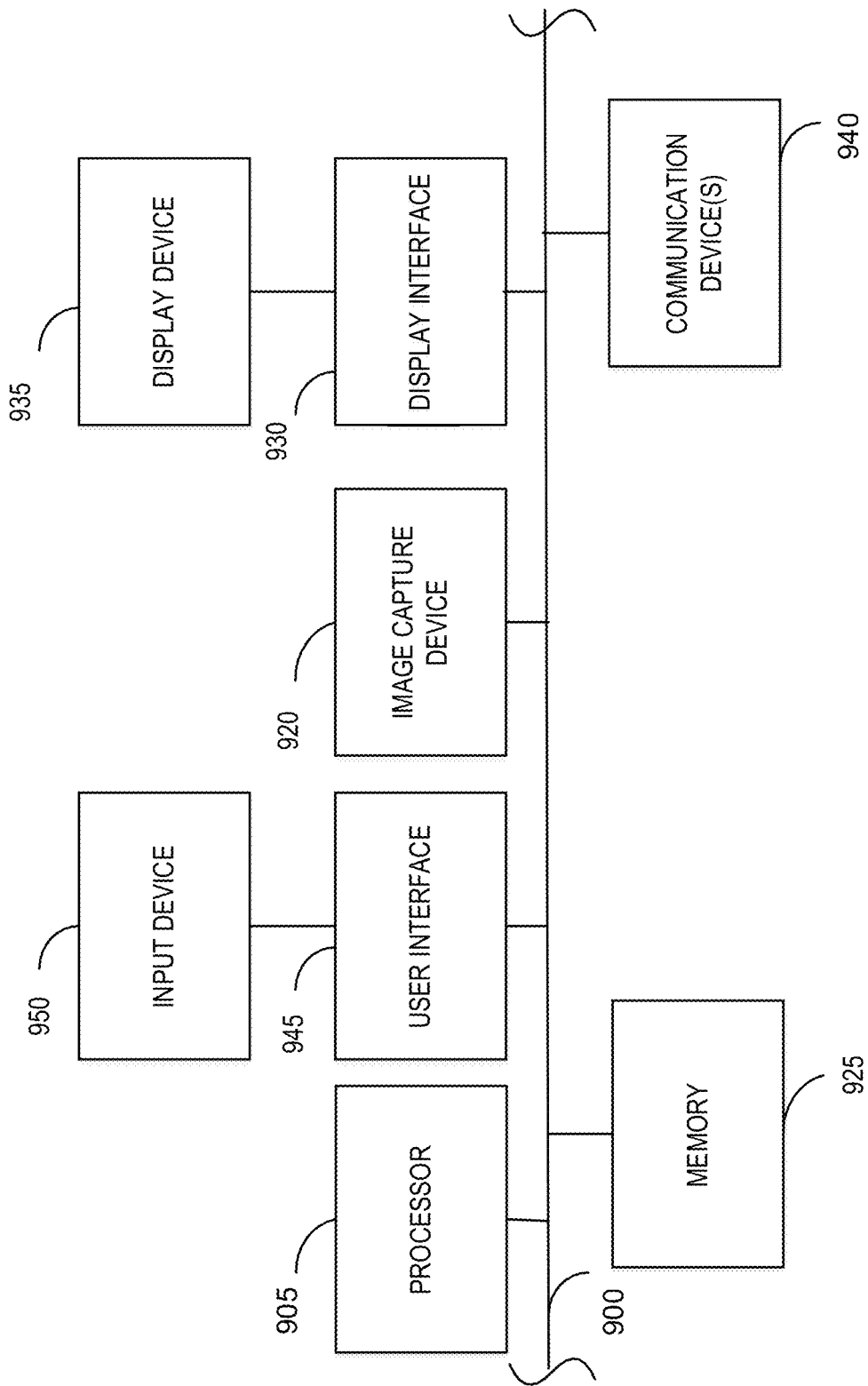
FIG. 9 depicts an example of internal hardware that may be included in any of the electronic components of the system, such as internal processing systems for controlling the display during the calibration process, computing devices, controllers, or remote servers.

Calibrating targets 600A, 600B, 600C and 600D are illustrated with fiducial markers denoted by cross-hatch elements. It should be understood that the fiducial markers may vary from one marker to another. The markers may be used in one calibration target of vertical and horizontal strips, such as in FIG. 6A, to form a checkerboard with another calibration target with vertical and horizontal strips. By way of non-limiting example, the calibration sequence may include targets 600A, 600B, 600C and 600D. In some embodiments, the images representative of targets 600A, 600B, 600D and 600D of the calibration sequence may be stored in a memory device (FIG. 9) and retrieved in sequence. Calibration pattern 500 will be described in more detail later. The calibration sequence may include a target representative of base calibration pattern 500 with an index marker 515 and may be stored in a memory device (FIG. 9).

Method 400 may include, at block 408, setting a timer. Method 400 may include, at block 410, causing the vision sensor to capture at least one image of the target displayed on display screen 135 during a calibration sequence. The vision sensor is at a fixed location relative to display screen 135 during the calibration process. The fixed location is less than one meter from calibration target device 130. Calibration target device 130 may be fixed during the calibration process. The image capturing phase (i.e., block 410) may be manual, automated, or both.

Method 400 may include, at block 412, determining whether a timer value "S" have been reached. If the determination is "NO," method 400 returns to block 412 to continue causing the vision sensor to capture the image of the target that is displayed on display screen 135. If the determination is "YES," method 400 proceeds to block 414. By way of non-limiting example, the timer value S may be 30 milliseconds (ms). However, it should be understood that other timer values may be used such as 2-100 ms, for example. For example, the difference in timer values may be based on ambient conditions where the calibration process takes place or whether the darkness or brightness of the target (i.e., targets 600A, 600B, 600C, 600D or 800) displayed.

Method 400 may include, at block 414, determining whether there is another calibration angle in the calibration angles of the sequence. At least one calibration angle may include 0°. If the determination is "YES," method 400 may loop back to block 404 to repeat blocks 404-414 for each remaining calibration angle of the calibration angles. Block 414 is associated with block 302B.

Method 400 may include, at block 416, performing calibration of the vision sensor in response to image processing for extracted calibration features in the at least one image of the target captured during the calibration sequence. The calibration is performed using the displayed calibration pattern in a calibration sequence.

Method 400 may include, at block 418, determining whether there is another pattern. If the determination at block 418 is "YES," method 400 may loop back to block 402 and repeat blocks 402-418 for each calibration pattern of one or more patterns. Block 418 is associated with block 302C. If the determination at block 418 is "NO," method 400 may end at block 420.

It should be understood, that the method 400 may use only one pattern in some variations. Additionally, a different pattern may include the same base pattern 500 but use a different set of calibration angles with |Z°| set to 10°-30°, for example. The calibration angles with |Z°| may include a range of to 5°-30°.

The images of the target are the same (vertical stripes) to illustrate how the virtual pattern is rotated based on a particular the pattern plane. In practice, each plane orientation may form extraction feature points for a calibration analysis to determine at least one of the extrinsic parameter, intrinsic parameters and lens distortion.

Figure 7:
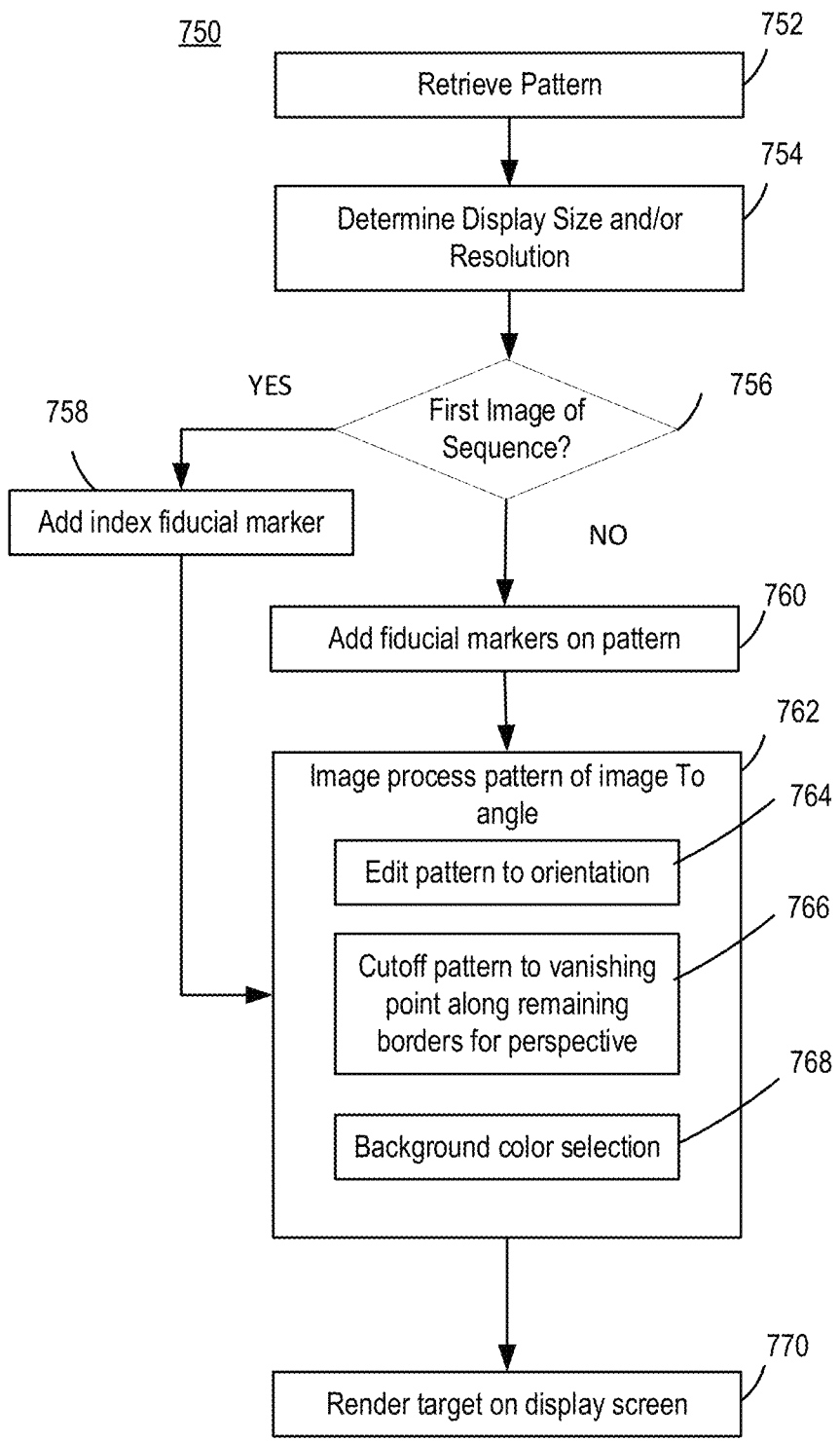
FIG. 7 illustrates a flowchart of a method for rendering a programmable calibrating target.

FIG. 7 illustrates a flowchart of a method 750 for rendering a programmable calibrating target. In some embodiments, sub-blocks of block 302A (FIG. 4) may be include one or more blocks of method 750. The rendering of the programmable calibrating target may be part of block 406 (FIG. 4) to display the target. Method 750 may include, at block 752, retrieving a pattern, such as pattern 700. The pattern may be a base calibration pattern, which is the first pattern used in a sequence. Or it may be a pattern that is different from the base calibration pattern if the sequence is already running and a different pattern is to be used. Retrieving the pattern may include executing instructions which creates a pattern of colored elements, stripes, boxes, or other geometric shapes. Method 750 may include, at block 754, determining a display size, aspect ratio or resolution of display screen 135. For example, if the resolution is 3800× 2160 and the orientation is generated with respect to top display screen border B1, then the target image extends the stripe's color along essentially the entire length of the originating perimeter border. In this case, the length would be 3800 pixels and the angling (i.e., |Z°|) according to a linear perspective is registered from the originating perimeter border (i.e., top display screen border B1) of the pattern to be rendered.

Method 750 may include, at block 756, may determine whether the first image of the sequence for calibration is being generated. If the determination, at block 756, is "YES," method 750 proceeds to block 758. If the determination, at block 756, is "NO," method 750 proceeds to block 760. At block 758, in a first image of the target, method 750 may include adding an index marker 515 such as a QR code or other barcode or matrix code (FIG. 5B). Method 750 may include, at block 760, adding fiducial markers (i.e., markers 505 FIG. 5A) to corners, edges and/or vertical stripes of pattern 500 of the target. Markers 505 are shown are for illustrative purposes only and not meant to be limiting in any way. There may be more or less markers. Each stripe may have a marker. In some variations, every other stripe may have at least one marker. By way of non-limiting example, the calibration features may include fiducial markers 505. Each marker may be associated with a different corner of two adjacent stripes of alternating black and white stripes. The QR code is configured to index the sequence for a selected pattern.

Method 750 may include, at block 762, processing the pattern of the image of the target to angle the pattern to a current calibration angle from an originating perimeter border of a display screen. Method 750 may include, at block 770, rendering the image of the target on display screen 135 to display the target, based on the processing of the image.

In various embodiments, block 762 of method 750 may include, at block 764, editing the selected calibration pattern (i.e., pattern 500) and, at block 766, removing a portion of the calibration pattern that is adjacent to an opposite parallel perimeter border relative to the originating perimeter border and tapered portions at the current calibration angle along those display screen borders perpendicular to the originating perimeter border, as best seen in FIGS. 6A-6D. The removed portion corresponds to the truncation of the pattern to the vanishing point described above in relation to targets 600A, 600B, 600C and 600D. The truncation amount of the target may include 0-25% of the displayed target size on the display screen relative to the vanishing point.

The editing of the pattern may include forming the linear perspective based on the originating perimeter border, the aspect ratio or resolution of the display screen, mid-point of opposite and parallel perimeter border relative to the originating perimeter border and horizon, for example. For more than one vanishing point to the horizon in a target, the mid-point may be substituted with other points associated with multi-vanishing points in a linear perspective view.

Block 762 of method 750 may include, at block 768, selecting a solid-color for the background for the image of the target to be rendered for those portions removed at block 766. In FIGS. 6A-6D, the background 602 is illustrated as the color grey for illustrative purposes but may be other colors except the colors of the pattern. The background color is useful in feature extraction, as the set background color may be used to identify those pixels outside of the perspective view of calibration pattern 500. Thus, the rendering process of block at block 770, includes rendering the edited calibration pattern on display screen 135 with pixels of the removed portion having the background color.

In some embodiments, one or more of the blocks of method 750 may be performed in FIG. 4, for example, adding fiducial markers and/or a QR code.

In one or more examples, one or more blocks of the described methods or techniques may be implemented in hardware, software, firmware, or any combination thereof. If implemented in software, the functions may be stored as one or more programming instructions or code on a computer-readable medium and executed by a hardware-based processing unit. Computer-readable media corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry.

Figure 8:
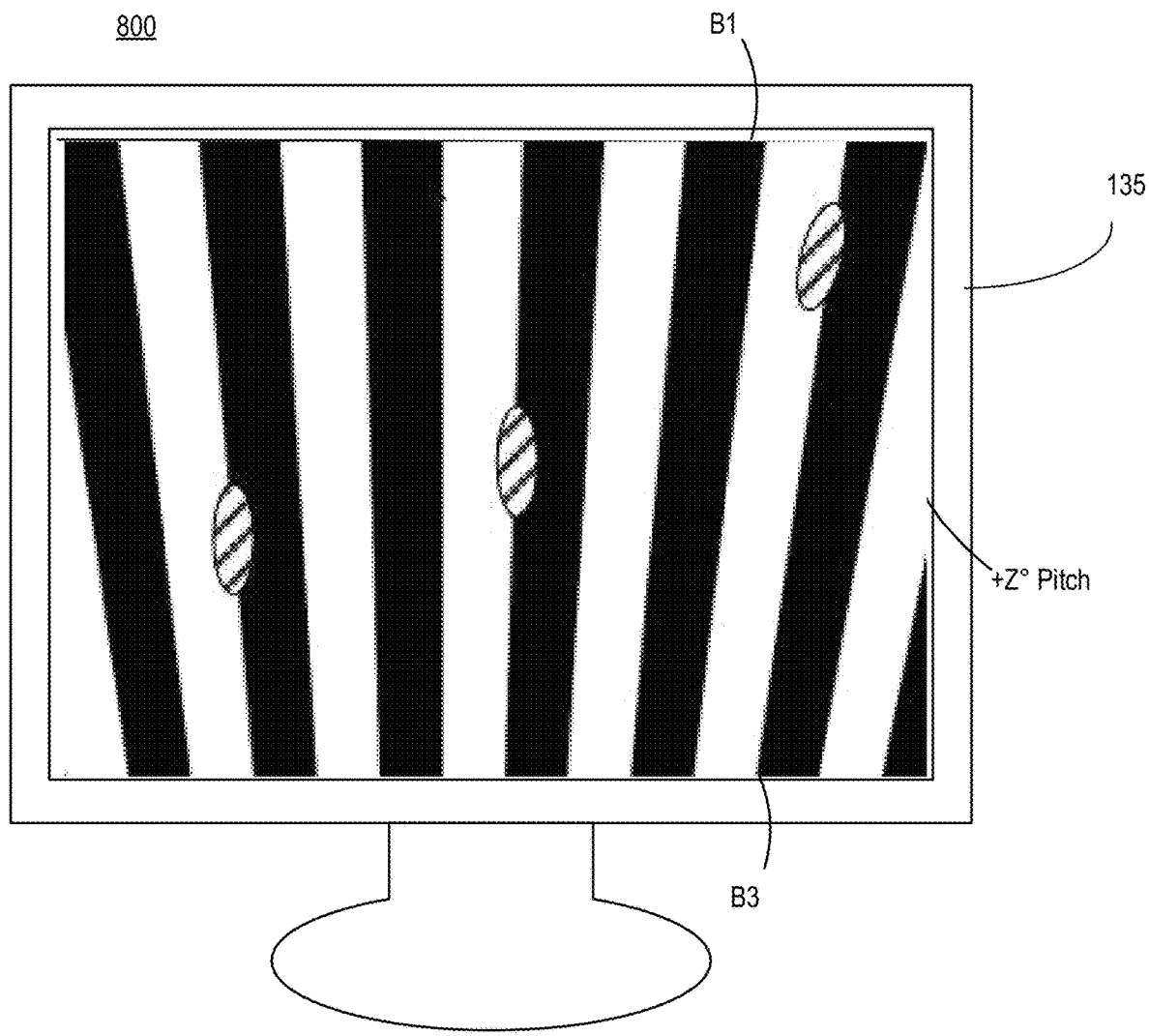
FIG. 8 illustrates an example calibrating target without truncation of the calibration pattern at a pitch angle of +Z.

FIG. 8 illustrates an example calibrating target 800 without truncation of the calibration pattern at a pitch angle of +Z. Calibrating target 800 has a first linear perspective of the pattern angled at the +Z° pitch angle which extends from the originating perimeter border (i.e., top display screen border B1) down to border B3. In various embodiments, the calibrating target 800 may be displayed without truncation to a vanishing point on the horizon. The pattern angled at the +Z° pitch angle in FIG. 8 is similar to the same pattern angle of FIG. 6A but without truncation. It should be understood, that calibrating targets of FIGS. 6B-6D can be displayed in a similar manner as shown in FIG. 8 without truncation. The calibrating target 800 may be representative of a calibrating target with a truncation amount of 0%.

FIG. 9 depicts an example of internal hardware that may be included in any of the electronic components of the system, such as calibration controllers, or calibration target devices. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device 925 may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 930 may permit information from bus 900 to be displayed on a display device 935 in visual, graphic or alphanumeric format. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. Communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera or image capture device 920 that can capture video and/or still images.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

A "programmable device" refers to an electronic device that includes a processor, programming instructions, and one or more components that based on commands from the processor can perform at least some operations or tasks with minimal or no human intervention. For example, a programmable device may perform one or more automatic functions or function sets. Examples of such operations, functions or tasks may include without, limitation, calibration-related processes, and/or the like. Example programmable devices may include, without limitation, display devices and computing devices with built-in display screen or separate display screen.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "execution flow" refers to a sequence of functions that are to be performed in a particular order. A function refers to one or more operational instructions that cause a system to perform one or more actions. In various embodiments, an execution flow may pertain to the operation of an automated device.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. In addition, the terms "front" and "rear" are not necessarily limited to forward-facing or rear-facing areas but also include side areas that are closer to the front than the rear, or vice versa, respectively.

The invention claimed is:

1. A method for calibration of vision sensors, the method comprising:
    (i) by a processor, selecting a calibration sequence having a base calibration pattern and calibration angles, wherein each of the calibration angles is associated with a different originating perimeter border of originating perimeter borders of a display screen;
    (ii) by the processor, generating a calibrating target that comprises the base calibration pattern at a selected calibration angle of the calibration angles;
    (iii) by the processor, causing the display screen to display a digital image representative of the calibrating target at the selected calibration angle relative to the originating perimeter border of the selected calibration angle;
    (iv) by a vision sensor, at a fixed location, capturing at least one image of the calibrating target displayed on the display screen;
    (v) repeating (ii)-(iv) for each calibration angle in the calibration sequence; and
    (vi) performing calibration of the vision sensor in response to image signal processing of extracted calibration features in the at least one image of the calibrating targets of the calibration sequence.

2. The method of claim 1, further comprising:
(vii) prior to (iii), generating an index marker in a first one of the displayed digital images of the calibration sequence;
(viii) selecting an additional calibration pattern of the calibration sequence; and
(ix) repeating (ii)-(vii) for the additional calibration pattern.

3. The method of claim 2, wherein the base calibration pattern comprises vertical or horizontal alternating black and white stripes.

4. The method of claim 3, wherein:
the extracted calibration features comprise markers;
each marker is associated with a different corner of two adjacent stripes of the alternating black and white stripes; and
the index marker comprises a barcode or matrix code in the first displayed image of the target.

5. The method of claim 4, wherein performing the calibration comprises:
(a) performing image signal processing to extract the calibration features in the at least one image of the calibrating target captured by the vision sensor; and
(b) determining an image quality metric for at least one extracted calibration feature.

6. The method of claim 1, wherein the calibration angles comprise +Z° pitch angle, −Z° pitch angle, +Z° yaw angle and −Z° yaw angle, where |Z°| is a non-zero value.

7. The method of claim 6, wherein |Z°| is in a range of 15°-30°.

8. The method of claim 6, wherein the base calibration pattern at the selected calibration angle relative to the originating perimeter border includes a linear perspective originating at the originating perimeter border extended in a direction to a vanishing point in a horizon.

9. The method of claim 8, wherein:
right and left display screen borders are perpendicular to the top and bottom display screen borders; and
generating of the calibration target comprises:
(a) editing the base calibration pattern,
(b) removing a portion of the base calibration pattern that is adjacent to an opposite parallel perimeter border relative to the originating perimeter border and tapered portions along those display screen borders perpendicular to the originating perimeter border,
(c) selecting a background color for the removed portions, and
(d) rendering an edited calibration pattern on the display screen with pixels of the removed portion having the background color.

10. The method of claim 1, wherein the fixed location is less than one meter from the display screen.

11. A system for calibration of vision sensors, the system comprising:
a calibration target device comprising a display screen;
a processor; and
a computer-readable storage medium comprising programming instructions that are configured to, when executed, cause the processor to:
(i) select a calibration sequence having a base calibration pattern and calibration angles, wherein each of the calibration angles is associated with a different originating perimeter border of originating perimeter borders of the display screen, (ii) generate a calibrating target that comprises the base calibration pattern at a selected calibration angle of the calibration angles,
(iii) cause the display screen to display a digital image representative of the calibrating target at the selected calibration angle relative to the originating perimeter border of the selected calibration angle,
(iv) cause a vision sensor, at a fixed location, to capture at least one image of the calibrating target displayed on the display screen,
(v) repeat (ii)-(iv) for each calibration angle of the calibration angles in the calibration sequence; and
(vi) perform calibration of the vision sensor in response to image signal processing of extracted calibration features in the at least one image of the calibrating targets of the calibration sequence.

12. The system of claim 11, further comprising programming instructions that are configured to, when executed, cause the processor to:
(vii) prior to (iii), generate an index marker in a first one of the displayed digital images of the calibration sequence;
(viii) select an additional calibration pattern of the calibration sequence; and
(ix) repeat (ii)-(vii) for the additional calibration pattern.

13. The system of claim 12, wherein:
the base calibration pattern comprises vertical or horizontal alternating black and white stripes.

14. The system of claim 13, wherein:
the extracted calibration features comprises markers, each marker is associated with a different corner of two adjacent stripes of the alternating black and white stripes; and
the index marker comprises a barcode or matrix code in the first displayed image.

15. The system of claim 14, wherein the programming instructions that are configured to, when executed, cause the processor to perform the calibration comprise programming instructions that when executed, cause the processor to:
perform image processing to extract the calibration features in the at least one image of the target captured by the vision sensor; and
(determine an image quality metric for at least one extracted calibration feature.

16. The system of claim 11, wherein the calibration angles comprise +Z° pitch angle, −Z° pitch angle, +Z° yaw angle and −Z° yaw angle, where |Z°| is a non-zero value.

17. The system of claim 16, wherein |Z°| is in a range of 15°-30°.

18. The system of claim 16, wherein the base calibration pattern at the selected calibration angle relative to the originating perimeter border includes a linear perspective originating at the originating perimeter border extended in a direction to a vanishing point in a horizon.

19. The system of claim 18, wherein:
right and left borders of the display screen are perpendicular to top and bottom borders of the display screen; and
the programming instructions that are configured to, when executed, cause the processor to generate the calibrating target comprise programming instructions that when executed, cause the processor to:
(a) edit the base calibration pattern;
(b) remove a portion of the base calibration pattern that is adjacent to an opposite parallel perimeter border relative to the originating perimeter border and tapered portions along those display screen borders perpendicular to the originating perimeter border;
(c) select a background color for the removed portions; and
(d) render an edited calibration pattern on the display screen with pixels of the removed portion having the background color.

20. The system of claim 11, wherein the fixed location is less than one meter from the calibration target device.

* * * * *